United States Patent Office 3,712,903
Patented Jan. 23, 1973

3,712,903
5[1-(PHENYL OR BENZYL)-1H-INDAZOL-3-YLOXYMETHYL]-TETRAZOLES
Laszlo Ambrus, Oakland, Calif., assignor to Cutter Laboratories, Inc., Berkeley, Calif.
No Drawing. Filed Apr. 17, 1968, Ser. No. 722,824
Int. Cl. C07d 57/00
U.S. Cl. 260—308 D                    9 Claims

ABSTRACT OF THE DISCLOSURE

Chemical compounds in which a tetrazolylmethyl radical replaces the hydrogen atom of a 1-phenyl or 1-benzyl-1H-indazol-3-ol are described.

The compounds are prepared by reaction of the alkali metal salt of the 1-phenyl or 1-benzyl-1H indazol-3-ol with a haloalkyl cyanide followed by the reaction of the cyano group with an alkali metal azide under conditions which converts the cyano group to a tetrazole.

The compounds possess anti-inflammatory activity as demonstrated by the limb volume test.

---

This invention relates to compositions of matter classified in the art of chemistry as substituted 1-phenyl- or 1-benzyl indazol-3-ols.

The invention sought to be patented resides in compositions of matter having a molecular structure in which 1-(subsituted phenyl or benzyl) indazole nucleus bears at its 3-position, through an ether oxygen atom, a tetrazolylmethyl group, and, in processes for making the same.

The tangible embodiments of this invention possess the inherent general physical properties of being crystalline solids and possess the applied use characteristics of exhibiting pharmacological anti-inflammatory activity.

A tetrazolylmethyl group is intended to mean a structure as follows:

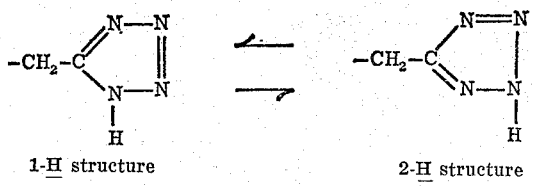

1-H structure          2-H structure

The 1-H and 2-H notation employed in the tetrazolylmethyl structures identifies which of the nitrogen atoms in the tetrazole ring bears a hydrogen atom and also which of the tautomeric forms is present and when substituents other than hydrogen are on the tetrazole ring. This same notation is used to indicate the position of other substituents. For example, the 1-H-tetrazole reacts with an alkali metal alkoxide to yield a sodium salt which has the 2-H structure and if a halo ester is reacted with this sodium salt, alkylation of the 2-position results yielding a 2-H derivative.

The tetrazole ring is preferably unsubstituted, i.e., bears only a hydrogen atom, but other groups, e.g., lower alkyl including methyl, ethyl, propyl and butyl; carboxymethyl; carb-lower alkoxymethyl including carbmethoxymethyl, carbethoxymethyl and carbpropoxymethyl; are illustrative of the groups which can be attached to the tetrazole ring. Ordinarily, these groups appear at the 2-position of the tetrazole ring. When unsubstituted, the hydrogen atom appears at either the 1- or 2-position.

The methylene group which forms the linkage between the tetrazole group and the ether oxygen is ordinarily unsubstituted but equivalents in which one or both hydrogen atoms are replaced with, for example, lower alkyl group including methyl, ethyl, propyl and butyl, are illustrative of groups which can appear at this position.

The 1-phenyl- or 1-benzyl ring can be substituted or unsubstituted. Substituents which can be on the 1-phenyl or 1-benzyl group are halogen, including chloro and fluoro; lower alkyl, including methyl, ethyl, propyl. isopropyl and butyl; lower alkoxy including methoxy, ethoxy, propoxy, isopropoxy and butoxy; trifluoromethyl. The 1-phenyl or 1-benzyl group can bear a multiplicity of groups although a limit of three groups is usually preferred.

When only one substituent is on the 1-phenyl or 1-benzyl ring, it can be at the ortho, meta or para position of the 1-phenyl ring and the corresponding 2,3 or 4-position of the phenyl portion of the benzyl ring.

When two substituents are on the 1-phenyl or 1-benzyl ring, they can be identical or any combination of the possible groups listed, e.g., chloro and trifluoromethyl, or bis-trifluoromethyl, and can appear at the 2,3; 2,4; 2,5; 3,4 or 3,5 positions of the phenyl group or the phenyl portion of the benzyl groups.

When three substituents are present on the 1-phenyl or 1-benzyl ring, they can also be mixed or identical and appear at the 2,4,5; 2,5,6 and 3,5,6 positions of the 1-phenyl ring or the phenyl portion of the 1-benzyl ring.

The methylene group of the 1-benzyl compounds of this invention which forms the linkage between the phenyl group and the 1-position of the indazole nucleus is ordinarily unsubstituted but equivalents, e.g., where one of the hydrogen atoms of the methylene group is replaced by a methyl group or where both hydrogen atoms are replaced by methyl groups are also intended.

The indazole ring can also bear substituents at the 5 and 6 positions including, for example lower alkyl including methyl, ethyl and propyl; halo including chloro and fluoro, amino; acylamido including acetamido, propioamido and butyrylamido; nitro.

The manner of making and using the invention will now be generally described so as to enable a person skilled in the art to make and use the same.

The compounds of this invention are prepared by a series of reactions beginning with the etherification of a 1-phenyl or 1-benzyl 1 H-indazol-3-ol to form a [1-(phenyl- or benzyl)- 1 H-indazol-3-yloxy]-alkyl cyanide. The reaction is conducted as per the Williamson Ether Synthesis using the alkali metal salt of a 1-(phenyl or benzyl)-1 H-indazol-3-ol and a halo alkyl cyanide. The resulting nitrile is then caused to react with an alkali metal azide in a high boiling solvent, e.g., dimethylformamide, in the presence of catalytic amounts of lithium chloride and stoichiometric amounts of ammonium chloride whereby the cyano group is converted into a tetrazole ring. The tetrazole which thereby results bears an acidic hydrogen atom in the 1-position of the tetrazole ring which after reaction with alkali metal bases forms an alkali metal salt at the 2-position which undergoes reaction with organic halogen compounds analogous to the Williamson Ether Synthesis. Thus, reaction of the tetrazole as prepared herein, with a base such as sodium methoxide, followed by reaction with halogen compound such as ethyl bromoacetate results in, for example, a carbethoxymethyl radical attached to the 2-position of the tetrazole ring.

The 1-phenyl-1H-indazol-3-ol employed in the Williamson Ether Synthesis to form the intermediate [1-phenyl-1H-indazol-3-yloxy]-alkyl nitrile is prepared by a series of reactions beginning with a phenylamine bearing any of the substituents desired on the phenyl ring at the 1-position of the indazol-3-ol. This amine is acetylated, e.g. with acetic anhydride. The resulting acetamide is arylated using bromobenzene bearing the substituents desired on the benzenoid portion of the indozale end product, potassium carbonate and catalytic amounts of potassium iodide and cuprous bromide in an inert solvent to obtain the corresponding substituted N-phenyl acetanilide. Hydrolysis with hydrochloric acid in ethanol yields a disubstituted amine, which is then reacted with an excess of phosgene at −5 or +5° C. to yield a substituted carbamoyl chloride. The reaction of sodium azide with the substituted carbamoyl chloride yields the corresponding carbamoyl azide which undergoes cyclization in refluxing solvents such as xylene to yield the substituted 1-phenyl-1H-indazol-3-ol. These reactions are illustrated as follows:

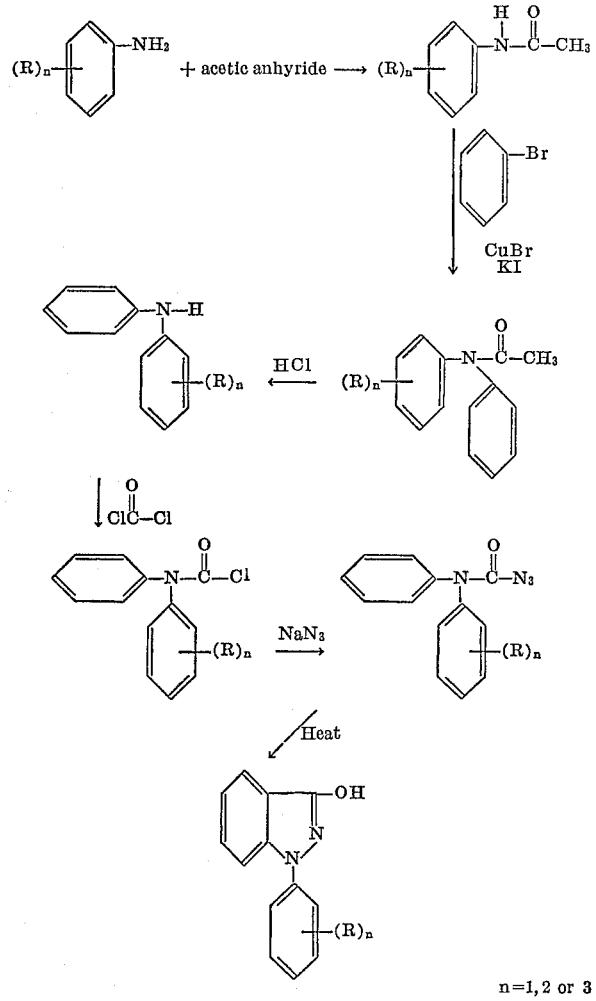

n=1, 2 or 3

The 1-benzyl-1H-indazol-3-ols are prepared by a different process than that employed for 1-phenyl-1H-indazol-ols. The benzyl halide, bearing any desired substituents on the benzyl ring, is caused to react with the reaction mixture resulting from the reaction of an alkali metal alkoxide and indazolone. The corresponding 1-benzyl-1H-indazol-3-ol is obtained upon working up the reaction mixture.

Substituted benzyl halides are prepared by conventional reactions, e.g., reaction of a substituted phenyl bromide with magnesium to form a Grignard reagent which in turn is reacted with formaldehyde to form a substituted benzyl alcohol. The benzyl alcohol is converted to the benzyl halide by reaction with concentrated halo acids, e.g., hydrochloric acid, and hydrobromic acid.

The novel chemical compounds are useful particularly in the field of pharmacology because of their pharmacological activity as anti-inflammatory agents.

The anti-inflammatory activity of said composition aspect is observed in laboratory animals after inflammation has been induced by subcutaneous injection of carrageenin. Reduction of the induced inflammation is observed when the test animals are treated with the compositions of this invention. Such treatment is accomplished either by subcutaneous injection or oral administration or topical administration of the composition aspect of this invention.

The limb volume test for anti-inflammatory activity is employed to test the activity of the composition aspect of this invention. In the procedure employed, male rats averaging 140–160 grams in weight were used. The volume of the left hind foot was measured by a mercury displacement method immediately before and twenty-four hours after a sub-plantar injection of 0.1 ml. of a 1 percent suspension of carrageenin in water.

Test substances were administered subcutaneously or orally in olive oil in five equal doses. Two doses were given the day prior to and two doses the day of injection of carrageenin, and the final dose was given the day of final limb measurement. Olive oil alone was used as a negative control.

Percent increase in limb volume produced by the carrageenin was calculated for each group. Percent change from control was also calculated for all treatment groups. A reduction in the increase in limb volume in animals given a test compound evidences an active response.

Food consumption and body weight were recorded for all groups as well as indices of systemic toxicity.

The foregoing discussion offered to illustrate methods suitable for the practice of our invention and not to limit its scope. The invention is further illustrated by the following preparations and examples:

The following steps are employed in the preparation or substituted 1-phenyl-1H-indazol-3-ol compounds used as precursors for the compounds of this invention.

PREPARATION 1

1-[3,5-bis(trifluoromethyl)phenyl]-1H-indazol-3-ol

Step 1: 3′,5′-bis(trifluoromethyl)acetanilide.—Two hundred grams of 3,5-bis(trifluoromethyl)aniline was dissolved in 300 ml. of dry benzene and 102 g. of acetic anhydride was added during a period of one hour with stirring. The reaction mixture was refluxed for one hour and allowed to cool to room temperature. It was then diluted with 300 ml. of pentane and the 3′,5′-bis(trifluoromethyl)acetanilide was filtered off as white crystals melting at about 150–152° C.

Step 2: N - phenyl - 3′,5′ - bis(trifluoromethyl)acetanilide.—Two hundred thirty grams of 3′,5′-bis(trifluoromethyl)acetanilide, 167 g. bromobenzene, 210 g. potassium carbonate, and 4 g. each of potassium iodide and cuprous bromide was placed in 600 ml. of nitrobenzene. The well-stirred mixture was heated to 170–200° C. for 28 hours. The nitrobenzene was steam distilled from the reaction mixture and the residue, after cooling to room temperature, was partitioned in ether-water. The ether layer was washed with water, the ether was removed under reduced pressure, and the oily residue was crystallized from pentane to give N-phenyl-3′,5′-bis(trifluoromethyl)acetanilide, white crystals, melting at about 79–80° C.

Step 3: 3,5-bis(trifluoromethyl)diphenylamine.—Two hundred forty grams of N-phenyl-3′,5′-bis(trifluoromethyl)acetanilide was dissolved in a mixture of 300 ml. of ethanol and 300 ml. of concentrated hydrochloric acid. The reaction mixture was refluxed for three hours. The alcohol was removed under reduced pressure, the residue diluted with two liters of water and extracted three times with ether. The combined ether fractions were washed with water and the ether boiled off. The oily residue was crystallized from pentane to give 3,5-bis(trifluoromethyl) diphenylamine, white crystals, melting at about 81–82° C.

Step 4: 3,5 - bis(trifluoromethyl)diphenylcarbamoyl chloride.—Ninety grams of phosgene was trapped in 300 ml. of chloroform at −10° C. and to this stirred solution was added a solution of 200 g. of 3,5-bis(trifluoromethyl)diphenylamine and 80 g. of pyridine in 200 ml. of chloroform over a period of one hour. The temperature of the reaction mixture was kept at −5 to +5° C.

during the addition, then allowed to warm to room temperature, where it was stirred for one hour and refluxed for two hours, cooled and poured on ice. The chloroform layer was washed repeatedly with water. The chloroform was removed under reduced pressure and the residual solid was suspended in pentane and filtered to give 3,5-bis(trifluoromethyl)diphenylcarbamoyl chloride, white crystals, melting at about 77–78° C.

Step 5: 3,5 - bis(trifluoromethyl)diphenylcarbamoyl azide.—Two hundred grams of 3,5-bis(trifluoromethyl) diphenylcarbamoyl chloride was dissolved in 500 ml. of acetone, stirred and warmed to reflux. Fifty grams of sodium azide in 200 ml. of water was added over a period of one hour. The acetone was removed under reduced pressure and the cooled reaction mixture extracted twice with 500 ml. portions of ether. The ether was removed under reduced pressure and the residue crystallized from pentane to give 3,5-bis(trifluoromethyl)diphenylcarbamoyl azide, white crystals, melting at about 79–81° C.

Step 6: 1-[3,5-bis(trifluoromethyl)phenyl]-1H-indazol-3-ol.—To 1500 ml. of p-xylene heated to reflux was added a solution of 200 g. of 3,5-bis(trifluoromethyl)diphenylcarbamoyl azide in 500 ml. of p-xylene over a period of three hours. The reaction mixture was refluxed for an additional two hours during which 1.5 liter of the solvent was allowed to boil off. The residue was cooled, filtered and recrystallized from hot ethanol to give 1-[3,5-bis(trifluoromethyl)phenyl]-1H-indazol - 3 - ol, white crystals, melting at about 224–226° C.

PREPARATIONS 2–10

By means of the six-step procedure described in Preparation 1, the following intermediates and substituted -1-phenyl-1H-indazol-3-ols were prepared having the physical properties shown in the table.

The following Preparations 11–13 are illustrative of procedure employed in the preparation of the 1-benzyl-1H-indazol-3-ol compounds used as precursors for the compositions of matter of this invention.

PREPARATION 11

1-(3-trifluoromethylbenzyl)-1H-indazol-3-ol

A mixture of 26.8 grams of indazolone and 10.8 grams of sodium methoxide in 300 milliliters of ethanol was warmed to reflux; while stirring and heating to reflux, 39 grams of 3-(trifluoromethyl)benzyl chloride is added over a period of two hours. Refluxing was continued for an additional hour. The reaction mixture was concentrated to 100 milliliters, diluted with about 300 milliliters of water and acidified with 10 percent hydrochloric acid. The precipitate which forms was collected and recrystallized from isopropanol to yield 1 - (3 - trifluoromethylbenzyl)-1H-indazol-3-ol melting at 185–6° C.

PREPARATIONS 12 AND 13

By means of the procedure described in Preparation 11, the 1(benzyl)1H-indazol-3-ols shown in the table were prepared.

In the following examples in which the results from the limb volume test for anti-inflammatory activity are included, the results are reported using the following notations.

SQ—dosage in milligrams per rat injected subcutaneously
(a)—oral dosage in milligrams per rat. Rats used in these tests averaged 150 grams
(b)—oral dosage in milligrams per kilogram of rat body weight
Percent change—the percentage change from the control as measured by the limb volume test

EXAMPLE 1

5-[1-(3-trifluoromethylphenyl)-1H-indazol-3-yloxymethyl]-1H-tetrazole

A mixture of 28 g. of 1-(3-trifluoromethylphenyl)-1H-indazol-3-ol and 5.5 g. of sodium methoxide was refluxed 10 minutes in 400 ml. acetonitrile and 40 ml. ethanol. At reflux, 9.8 g. chloroacetonitrile was added in about an hour. Refluxing was continued for an hour and the solvent was removed by distillation. The residue was poured onto ice, extracted with ether, the ether extract was dried over magnesium sulfate and the solvent removed. Crystallization from isopropanol gave 23 g. white crystals, 1-(3-trifluoromethylphenyl)-1H-indazol-3-yloxyacetonitrile, melting at about 74–76° C. A mixture of this compound with 6.5 g. sodium azide, 6.3 g. ammonium chloride, and 1 g. lithium chloride in 100 ml. dimethylformamide was stirred and heated at about 110–130° C. for twenty hours. The solvent was removed under reduced pressure, the residue was treated with water, and to the resulting suspension was added dilute hydrochloric acid until the mixture was acidic. The product collected by filtration was recrystallized from isopropanol to give 5-[1 - (3 - trifluoromethylphenyl) - 1H - indazol - 3 - yloxymethyl]-1H-tetrazole, melting at about 191–193° C.

Analysis. — Calcd. for $C_{16}H_{11}F_3N_6O$ (percent): C, 53.34; H, 3.08; N, 23.33. Found (percent): C, 53.78; H, 3.26; N, 22.92.

Limb volume test: Dosage, 60(b). Percent change from control, 45.3.

EXAMPLE 2

5-{1-[3,5-bis(trifluoromethyl)phenyl]-1H-indazol-3-yloxymethyl}-1H-tetrazole

Using 1-[3,5-bis(trifluoromethyl)phenyl]-1H-indazol-3-ol (prepared as described in steps 1–6), {1-[3,5-bis(trifluoromethyl)phenyl]-1H-indazol - 3 - yloxy}acetonitrile was prepared according to the procedure described in Example 1. The compound melted at about 113–114° C. By the procedure of Example 1, this was converted to 5 - {1 - [3,5 - bis(trifluoromethyl)phenyl]-1H-indazol-3-yloxymethyl}-1H-tetrazole, melting at about 198–200° C.

Analysis. — Calcd. for $C_{17}H_{10}F_6N_6O$ (perecnt): C,

| Preparation | R | Step 1 NHCOCH$_3$ R | Step 2 φ—NCOCH$_3$ R | Step 3 φ—NH R | Step 4 φ—NCOCl R | Step 5 φ—NCON$_3$ R | Step 6 1-phenyl or 1-benzyl 1H-indazol-3-ol (° C.) |
|---|---|---|---|---|---|---|---|
| 2 | C$_6$H$_5$ | | | | | | 207–209 |
| 3 | 2,3-(CH$_3$)$_2$-C$_6$H$_3$ | 132–134° C | 84–86° C | 61–63° C | 94–95° C | 97–98° C | 235–236 |
| 4 | 3-Cl-C$_6$H$_4$ | 80–81° C | Oil | Oil | Oil | Oil | 248–250 |
| 5 | 2-F-C$_6$H$_4$ | 71–72° C | 120–122° C | Oil | 105–107° C | Oil | 210–211 |
| 6 | 3-F-C$_6$H$_4$ | 80–81° C | Oil | Oil | Oil | Oil | 201–202 |
| 7 | 4-F-C$_6$H$_4$ | 142–143° C | Oil | Oil | 80–81° C | 68–70° C | 240–242 |
| 8 | 4-CF$_3$—C$_6$H$_4$ | 152° C | Oil | Oil | Oil | Oil | 185–192 |
| 9 | 3-CF$_3$—C$_6$H$_4$ | 102–103° C | Oil | Oil | 56–57° C | 44–46° C | 193–195 |
| 10 | 2-Cl-5CF$_3$-C$_6$H$_3$- | 96–97° C | 82–83° C | Oil | 98–99° C | 56–58° C | 191–193 |
| 11 | 3-CF$_3$-C$_6$H$_4$-CH$_2$ | | | | | | 185–186 |
| 12 | C$_6$H$_5$—CH$_2$ | | | | | | 167–168 |
| 13 | 4-Cl-C$_6$H$_4$-CH$_2$ | | | | | | 175–176 |

47.68; H, 2.35; N, 19.62. Found (percent): C, 47.92; H, 2.49; N, 19.42.

Limb volume test:

| Dosage: | Percent change from control |
| --- | --- |
| 5 (SQ) | 55.4 |
| 1.0(b) | 25.0 |
| 2.5(b) | 32.4 |
| 5.0(b) | 47.3 |
| 20.0(b) | 82.8 |
| 0.5(b) | 20.8 |
| 1.5(b) | 18.9 |

EXAMPLE 3

5-[1-(2,3-dimethylphenyl)-1H-indazol-3-yloxymethyl] 1H-tetrazole

By the procedure described in Example 1, using 1-(2,3-dimethylphenyl) - 1H - indazol-3-ol in place of 1-(3-trifluoromethylphenyl)-1H-indazol-3-ol, there was obtained 1-(2,3-dimethylphenyl)-1H-indazol - 3 - yloxyacetonitrile, melting at about 100–101° C. This was converted to 5-[1-(2,3-dimethylphenyl) - 1H - indazol - 3 - yloxymethyl] 1H-tetrazole, melting at about 160–161° C.

*Analysis.*—Calcd. for $C_{17}H_{16}N_6O$ (percent): C, 63.74; H, 5.03; N, 26.24. Found (percent): C, 63.53; H, 4.92; N, 26.36.

Limb volume test:

| Dosage: | Percent change from control |
| --- | --- |
| 10(b) | 27.5 |
| 60(b) | 59.4 |

EXAMPLE 4

5-[1-(2-fluorophenyl)-1H-indazol-3-yloxymethyl]-1H-tetrazole

By the procedure described in Example 1, using 1-(2-fluorophenyl)-1H-indazol-3-ol in place of 1-(3-trifluoromethylphenyl)-1H-indazol-3-ol, there was obtained 1-(2-fluorophenyl)-1H-indazol-3-yloxyacetonitrile, melting at about 62–64° C. This was converted to 5-[1-(2-fluorophenyl)-1H-indazol-3-yloxymethyl] - 1H - tetrazole, melting at about 164–165° C.

*Analysis.* — Calcd. for $C_{15}H_{11}FN_6O$ (percent): C, 58.06; H, 3.57; N, 27.09. Found (percent): C, 57.89; H, 3.71; N, 27.08.

Limb volume test:

| Dosage: | Percent change from control |
| --- | --- |
| 10(b) | 24.6 |
| 60(b) | 37.7 |

EXAMPLE 5

5-[1-(3-fluorophenyl)-1H-indazol-3-yloxymethyl]-1H-tetrazole

By the procedure described in Example 1, using 1-(3-fluorophenyl)-1H-indazol-3-ol in place of 1-(3-trifluoromethylphenyl)-1H-indazol-3-ol, there was obtained 1-(3-fluorophenyl)-1H-indazol-3-yloxyacetonitrile, melting at about 82–83° C. This was converted to 5-[1-(3-fluorophenyl) - 1H - indazol - 3 - yloxymethyl] - 1H - tetrazole, melting at about 150–152° C.

*Analysis.* — Calcd. for $C_{15}H_{11}FN_6O$ (percent): C, 58.06; H, 3.57; N, 27.09. Found (percent): C, 58.27; H, 3.44; N, 27.20.

Limb volume test:

| Dosage: | Percent change from control |
| --- | --- |
| 10(b) | 26.1 |
| 60(b) | 43.5 |

EXAMPLE 6

5-[1-(4-fluorophenyl)-1H-indazol-3-yloxymethyl]-1H-tetrazole

By the procedure described in Example 1, using 1-(4-fluorophenyl - 1H - indazol - 3 - ol in place of 1-(3-trifluoromethylphenyl) - 1H - indazol - 3 - ol, there was obtained 1 - (4 - fluorophenyl) - 1H - indazol - 3 - yloxyacetonitrile, melting at about 99–101° C. This was converted to 5 - [1 - (4 - fluorophenyl) - 1H - indazol-3-yloxymethyl]-1H-tetrazole, melting at about 195– 197° C.

*Analysis.*—Calcd. for $C_{15}H_{11}FN_6O$ (percent): C, 58.06; H, 3.57; N, 27.09. Found (percent): C, 57.79; H, 3.37; N, 27.26.

Limb volume test:

| Dosage: | Percent change from control |
| --- | --- |
| 10(b) | 37.7 |
| 60(b) | 53.6 |

EXAMPLE 7

5-(1-phenyl-1H-indazol-3-yloxymethyl)-1H-tetrazole

By the procedure described in Example 1, using 1-phenyl - 1H - indazol - 3 - ol in place of 1 - (3 - trifluoromethylphenyl) - 1H - indazol - 3 - ol, there was obtained 1-phenyl-1H-indazol-3-yloxyacetonitrile, melting at about 89–91° C. This was converted to 5-(1-phenyl-1H-indazol-3-yloxymethyl)-1H-tetrazole, melting at about 160–161° C.

*Analysis.*—Calcd. for $C_{15}H_{12}N_6O$ (percent): C, 61.64; H, 4.14; N, 28.75. Found (percent): C, 61.87; H, 4.14; N, 28.60.

Limb volume test:

| Dosage: | Percent change from control |
| --- | --- |
| 10(b) | 30.0 |
| 60(b) | 39.1 |

EXAMPLE 8

Sodium 5-{1-[4-(trifluoromethyl)phenyl]-1H-indazol-3-yloxymethyl}2-H-tetrazole

By the procedure described in Example 1 using 1-(4-trifluoromethylphenyl) - 1H - indazol - 3 - ol in place of 1 - (3 - trifluoromethylphenyl) - 1H - indazol - 3 - ol, there was obtained 1 - (4 - trifluoromethylphenyl) - 1H-indazol-3-yloxyacetonitrile, melting at about 78–80° C. This was further reacted as described in Example 1 to give an oil which was converted to the sodium salt with sodium methoxide to give the desired sodium 5-{1-[4-(trifluoromethyl) - phenyl] - 1H - indazol - 3 - yloxymethyl}-2H-tetrazole, melting at about 219–221° C.

*Analysis.*—Calcd. for $C_{16}H_{10}F_3N_6NaO$ (percent): C, 50.27; H, 2.64; N, 21.99. Found (percent): C, 50.40; H, 2.80; N, 21.90.

Limb volume test:

| Dosage: | Percent change from control |
| --- | --- |
| 3.3(b) | 21.0 |
| 10.0(b) | 29.0 |
| 30.0(b) | 22.6 |

EXAMPLE 9

5-[1-(3-trifluoromethylphenyl)-1H-indazol-2-yloxymethyl]-2H-tetrazole-2-acetic acid 7.5 grams of 5 - [1 - (3 - trifluoromethylphenyl)-1H-indazol - 3 - yloxymethyl] - 1H - tetrazole and 1.2 g. of sodium methoxide were warmed to reflux in 150 ml. of ethanol and 5.0 g. ethyl bromoacetate was added over a period of two hours. The solvent was allowed to boil off and the residue was partitioned between ether and water. The ether portion was washed with water and the solvent was evaporated. The residual oil was then taken up in methanol, warmed on the steam bath, and a solution of 5 percent sodium hydroxide was added till the solution tested strongly basic. The solution was acidified with 10 percent hydrochloric acid and filtered. The solid was crystallized from isopropanol to give the desired 5-[1-(3-trifluoromethylphenyl) - 1H - indazol - 3 - yloxymethyl]-2H-tetrazole-2-acetic acid, melting at about 180–182° C.

*Analysis.*—Calcd. for $C_{18}H_{13}F_3N_6O_3$ (percent): C, 51.68; H, 3.13; N, 20.09. Found (percent): C, 51.49; H, 3.71; N, 19.96.

Limb volume test: Dosage, 5 (SQ). Percent change from control, 16.9.

EXAMPLE 10

5-{1-[3-(trifluoromethyl)benzyl]-1H-indazol-3-yloxymethyl}-1H-tetrazole

A mixture of 26.8 g. of indazolone and 10.8 g. of sodium methoxide in 300 ml. ethanol was warmed to reflux. With stirring, 39 g. 3-(trifluoromethyl)benzyl chloride was added over a period of two hours, refluxing was continued for an additional hour and the mixture was concentrated to 100 ml. The concentrate was diluted with about 300 ml. water and acidified with 10 percent hydrochloric acid. The precipitate was recrystallized from isopropanol to give 1 - (3 - trifluoromethyl) - benzyl-1H-indazol-3-ol, melting at about 185–186° C.

By the procedure described in Example 1, using 1-(3-trifluoromethyl)benzyl-1H-indazol-3-ol in place of 1-(3-trifluoromethyl)phenyl - 1H - indazol - 3 - ol, there was obtained 1 - (3 - trifluoromethyl)benzyl - 1H - indazol-3-yloxyacetonitrile, melting at about 64–65° C. This was converted to 5 - {1 - [3 - (trifluoromethyl)benzyl]-1H-indazole - 3 - yloxymethyl} - 1H - tetrazole, melting at about 162–164° C.

Analysis.—Calcd. for $C_{17}H_{13}F_2N_6O$ (percent): C, 54.55; H, 3.50; N, 22.45. Found (percent): C, 54.29; H, 3.48; N, 22.62.

Limb volume test:

| Dosage: | Percent change from control |
| --- | --- |
| 10.0(b) | 17.7 |
| 60.0(b) | 29.0 |

EXAMPLE 11

5-{1-[3,5-bis(trifluoromethyl)phenyl] - 1H - indazol - 3-yloxymethyl} - 2 - (3 - dimethylaminopropyl) - 2H-tetrazole hydrochloride A mixture of 23 g. of 5-{1-[3,5-bis(trifluoromethyl)phenyl]-1H-indazol-3-yloxymethyl}-1H-tetrazole and 3.6 g. of sodium methoxide was refluxed 10 minutes in 400 ml. ethanol. While stirring, a solution of 6.0 g. of 3-dimethylaminopropyl chloride in 100 ml. of toluene was added over a period of two hours and refluxing was continued for one additional hour. Most of the solvent was allowed to distill from the reaction mixture, which was then diluted with ether, washed with water, the ether portion was dried over magnesium sulfate, filtered and the solvent removed. The residue was taken up in 100 ml. isopropanol and acidified to about pH 2 with ethereal hydrogen chloride solution. The product collected by filtration was recrystallized from isopropanol to give 5-{1-[3,5-bis(trifluoromethyl)phenyl]-1H-indazol - 3 - yloxymethyl}-2-(3 - dimethylaminopropyl)-2H-tetrazole hydrochloride, melting at about 130–132° C. (hygroscopic).

Analysis.—Calcd. for $C_{22}H_{21}F_6N_7O \cdot HCl$ (percent): C, 48.05; H, 4.04; N, 17.83. Found (percent): C, 48.0; H, 4.1; N, 17.5.

Limb volume test:

| Dosage: | Percent change from control |
| --- | --- |
| 40(b) | 45.8 |
| 120(b) | 64.4 |

EXAMPLE 12

5-{1-[3,5-bis(trifluoromethyl)benzyl]-1H-indazol-3-yloxymethyl}-1H-tetrazole

Eight grams of magnesium were covered with dry diethyl ether and a solution of 100 g. of 3,5-bis(trifluoromethyl)bromobenzene in 400 ml. of dry diethyl ether was added at a rate to maintain reflux of the solvent. After the addition was complete, the reaction mixture was warmed and refluxed for one additional hour. By the procedure described in Organic Syntheses, vol. 1, page 188, formaldehyde obtained from 30 g. of paraformaldehyde was added to the Grignard reagent. The reaction mixture was poured onto ice containing hydrochloric acid and the ethereal solution washed several times with water. The organic layer was dried over magnesium sulfate, filtered, the solvent was boiled off and the residue distilled under reduced pressure to give the desired 3,5-bis(trifluoromethyl)benzyl alcohol, melting at about 44–45° C. (boiling at 100° C. at 14 mm. pressure).

To 55 g. of 3,5-bis(trifluoromethyl)benzyl alcohol was added 200 ml. 48% hydrobromic acid and 20 ml. concentrated sulfuric acid. After refluxing for six hours, the layers were separated and the aqueous layer was repeatedly extracted with ether. The combined ether extracts were added to the organic layer, washed with water, dried over magnesium sulfate, filtered, and the solvent was boiled off. The residue was distilled under reduced pressure, to give the desired 3,5-bis(trifluoromethyl)benzyl bromide, boiling at 136–140° C./14 mm., $n^{26}$ 1.4440.

Forty grams of indazolone and 16.2 g. sodium methoxide was warmed to reflux in 400 ml. ethanol. To this suspension was added 65 g. of 3,5 - bis(trifluoromethyl)benzyl bromide over a period of two hours, refluxing was continued for one additional hour and the mixture was concentrated to 100 ml. It was diluted with water, made acidic with 10% hydrochloric acid, filtered, and the product crystallized from isopropanol to give 1-[3,5-bis(trifluoromethyl)benzyl]-1H-indazol-3-ol, melting at about 190–191° C.

By the procedure of Example 1, using 1-[3,5-bis(trifluoromethyl)benzyl]-1H-indazol-3-ol in place of 1-(3-trifluoromethyl phenyl)-1H-indazol-3-ol, 1-[3,5 - bis(trifluoromethyl)benzyl]-1H-indazol-3-yloxyacetonitrile was obtained melting at about 102–103° C. This was converted to 5 - {1 - [3,5-bis(trifluoromethyl)benzyl]-1H-indazol-3-yloxymethyl}-1H-tetrazole, melting at about 218–220° C.

Analysis.—Calcd. for $C_{18}H_{12}F_6N_6O$ (percent): C, 48.88; H, 2.72; N, 19.00. Found (percent): C, 48.62; H, 2.85; N, 18.8.

Limb volume test:

| Dosage: | Percent change from control |
| --- | --- |
| 10(b) | 0 |
| 60(b) | 11.9 |

What is claimed is:

1. 5-tetrazole wherein the phenyl group bears 0–3 substituents selected from the group consisting of halo, lower-alkyl, lower-alkoxy and trifluoromethyl; the indazole ring bears at the 5- and 6-positions 0–2 substituents selected from the group consisting of lower-alkyl, halo, amino, acetamido, propionamido, butyramido and nitro; the bridging oxymethylene group between the indazol and tetrazole ring bears 0–2 lower-alkyl groups; and the tetrazole ring is unsubstituted.

2. A compound according to claim 1 wherein the indazole and tetrazole rings and the bridging oxymethylene group are unsubstituted.

3. A compound of claim 1, 5-{1-[3,5-bis(trifluoromethyl)-phenyl]-1H-indazol-3-yloxymethyl}-1H-tetrazole.

4. A compound of claim 1, 5-[1-(2,3-dimethylphenyl)-1H-indazol-3-yloxymethyl]-1H-tetrazole.

5. A compound of claim 1, 5-[1-(4-fluorophenyl)-1H-indazol-3-yloxymethyl]-1H-tetrazole.

6. A compound of claim 1, sodium 5-{1-[4-trifluoromethyl)phenyl]-1H-indazol-3-yloxymethyl}-2H-tetrazole.

7. A compound of claim 1, 5-(1-phenyl-1H-indazol-3-yloxymethyl)-1H-tetrazole.

8. A compound of claim 1, 5-[1-phenyl-1H-indazol-3-yloxymethyl]-1H-tetrazole wherein the phenyl group bears 0–3 ring substituents selected from the group consisting of halogen, lower-alkyl, lower-alkoxy and trifluoromethyl.

9. A compound of claim 8 wherein the phenyl group bears 1–2 substituents, at least one of which is fluorine or trifluoromethyl.

(References on following page)

References Cited

UNITED STATES PATENTS

| | | | |
|---|---|---|---|
| 3,161,654 | 12/1964 | Shen | 260—326.12 |
| 3,470,194 | 9/1969 | Palazzo | 260—310 |
| 3,138,636 | 6/1964 | Scherrer | 260—471 |
| 3,294,813 | 12/1966 | Juby | 260—308 |
| 3,342,834 | 9/1967 | Shen | 260—326.13 |
| 3,417,096 | 12/1968 | Juby | 260—308 |

OTHER REFERENCES

Graff (ed.): "Essays in Biochemistry," John Wiley & Sons, Inc., New York, 1956, pp. 141–154.

ALTON D. ROLLINS, Primary Examiner

U.S. Cl. X.R.

260—310 C, 349, 544 C, 562 R, 562 P, 571, 576, 578, 618 D, 651 F; 424—273